United States Patent
Schuermann

(10) Patent No.: US 9,309,926 B2
(45) Date of Patent: Apr. 12, 2016

(54) COUPLING

(75) Inventor: Erich Schuermann, Sendenhorst (DE)

(73) Assignee: INVENION GmbH, Sendernhorst (DE)

( * ) Notice: Subject to any disclaimer, the term of this patent is extended or adjusted under 35 U.S.C. 154(b) by 265 days.

(21) Appl. No.: 13/582,835

(22) PCT Filed: Mar. 31, 2011

(86) PCT No.: PCT/DE2011/000351
§ 371 (c)(1),
(2), (4) Date: Nov. 19, 2012

(87) PCT Pub. No.: WO2011/120510
PCT Pub. Date: Oct. 6, 2011

(65) Prior Publication Data
US 2013/0170901 A1    Jul. 4, 2013

(30) Foreign Application Priority Data

Mar. 31, 2010 (DE) .......................... 10 2010 013 720
Oct. 6, 2010 (DE) .......................... 10 2010 047 466

(51) Int. Cl.
*F16B 7/04* (2006.01)
*F16D 1/033* (2006.01)
*F16D 1/076* (2006.01)
*F16D 3/38* (2006.01)

(52) U.S. Cl.
CPC ................ *F16D 1/033* (2013.01); *F16D 1/076* (2013.01); *F16B 7/0406* (2013.01); *F16D 3/38* (2013.01); *Y10T 403/64* (2015.01); *Y10T 403/7045* (2015.01)

(58) Field of Classification Search
CPC ... E04B 1/5831; E04B 1/5843; F16B 7/0406; F16B 7/044; F16B 7/18; F16B 7/182; F16B 7/20; F16B 21/02; F16D 1/00; F16D 1/02; F16D 1/033; F16D 1/076
USPC .......... 403/97, 169, 205, 335–338, 343, 364, 403/380, 404; 464/16, 157–159
See application file for complete search history.

(56) References Cited

U.S. PATENT DOCUMENTS

| | | | |
|---|---|---|---|
| 2,303,031 A | | 11/1942 | Dusevoir |
| 2,303,032 A | | 11/1942 | Dusevoir |
| 3,184,988 A | * | 5/1965 | Osplack et al. ................. 74/457 |
| 3,495,857 A | * | 2/1970 | Hawke et al. ................... 403/97 |
| 3,557,574 A | | 1/1971 | Avery |

(Continued)

FOREIGN PATENT DOCUMENTS

| | | |
|---|---|---|
| DE | 9411268 U | 10/1942 |
| DE | 19710002 B | 6/1998 |

(Continued)

*Primary Examiner* — Josh Skroupa
(74) *Attorney, Agent, or Firm* — Andrew Wilford

(57) ABSTRACT

A coupling has face gears for transmitting torque or transverse forces between a first part provided with a first face gear and a second part provided with a second face gear complementary to the first face gear. At least one of the parts is a shaft, an axle, a pin or a flange, and it is possible to bring the first face gear into form-fitting engagement with the second face gear. At least one of the face gears has at least one groove having a constant width and a longitudinal centerline forming a semicircular arc having a respective first center of curvature in at least one section of the groove and, in at least one other section of the groove, forming another semicircular arc having a respective second center of curvature.

6 Claims, 15 Drawing Sheets

(56) References Cited

U.S. PATENT DOCUMENTS

Figure 9:
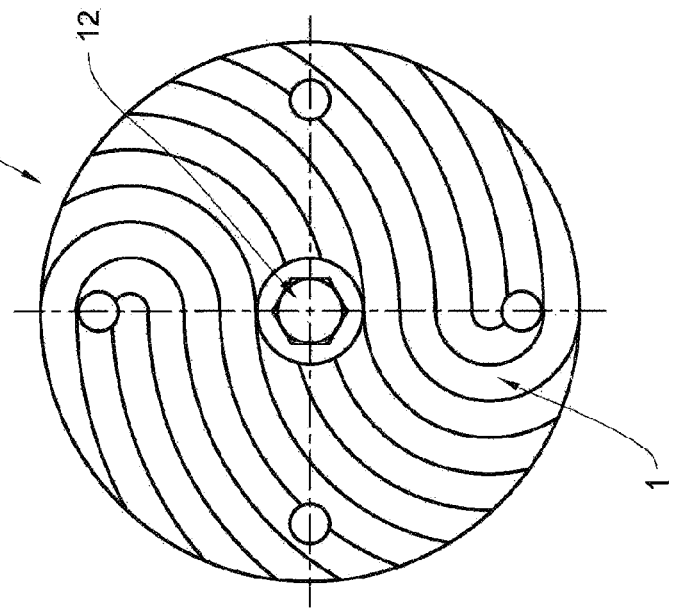

| | | | |
|---|---|---|---|
| 3,952,547 A * | 4/1976 | Klein et al. | 464/51 |
| 4,053,248 A | 10/1977 | Schultenkamper | |
| 4,191,487 A * | 3/1980 | Schultenkamper | 403/337 |
| 4,238,970 A * | 12/1980 | Carter | 74/457 |
| 4,242,889 A * | 1/1981 | Muller et al. | 464/157 |
| 5,051,071 A | 9/1991 | Haentjens | |
| 5,051,075 A * | 9/1991 | Young | 464/102 |
| 5,149,255 A | 9/1992 | Young | |
| 5,226,622 A * | 7/1993 | LeAnna | 248/183.2 |
| 2009/0096278 A1 | 4/2009 | Cermak | |

FOREIGN PATENT DOCUMENTS

| | | | | |
|---|---|---|---|---|
| DE | 102008030496 A1 * | 12/2009 | | F16D 1/076 |
| DE | 102008047296 A1 * | 4/2010 | | F16D 1/033 |
| FR | 2465928 A1 * | 3/1981 | | F16D 1/033 |

* cited by examiner

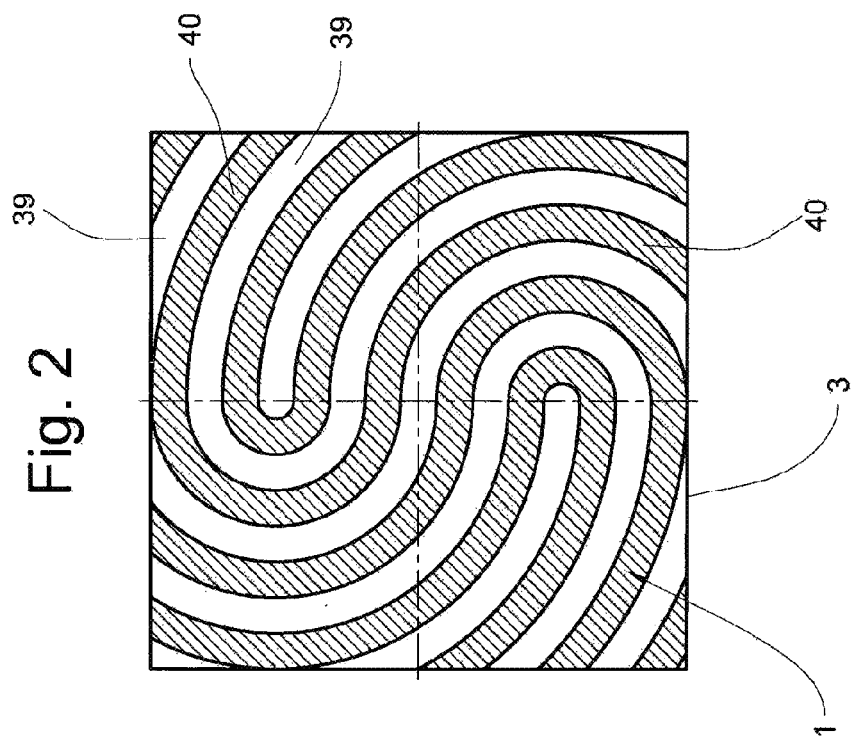
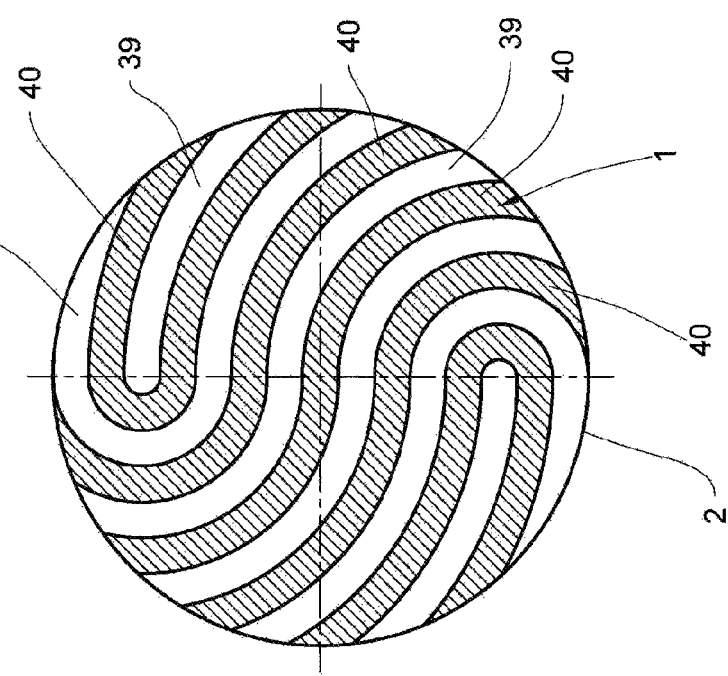

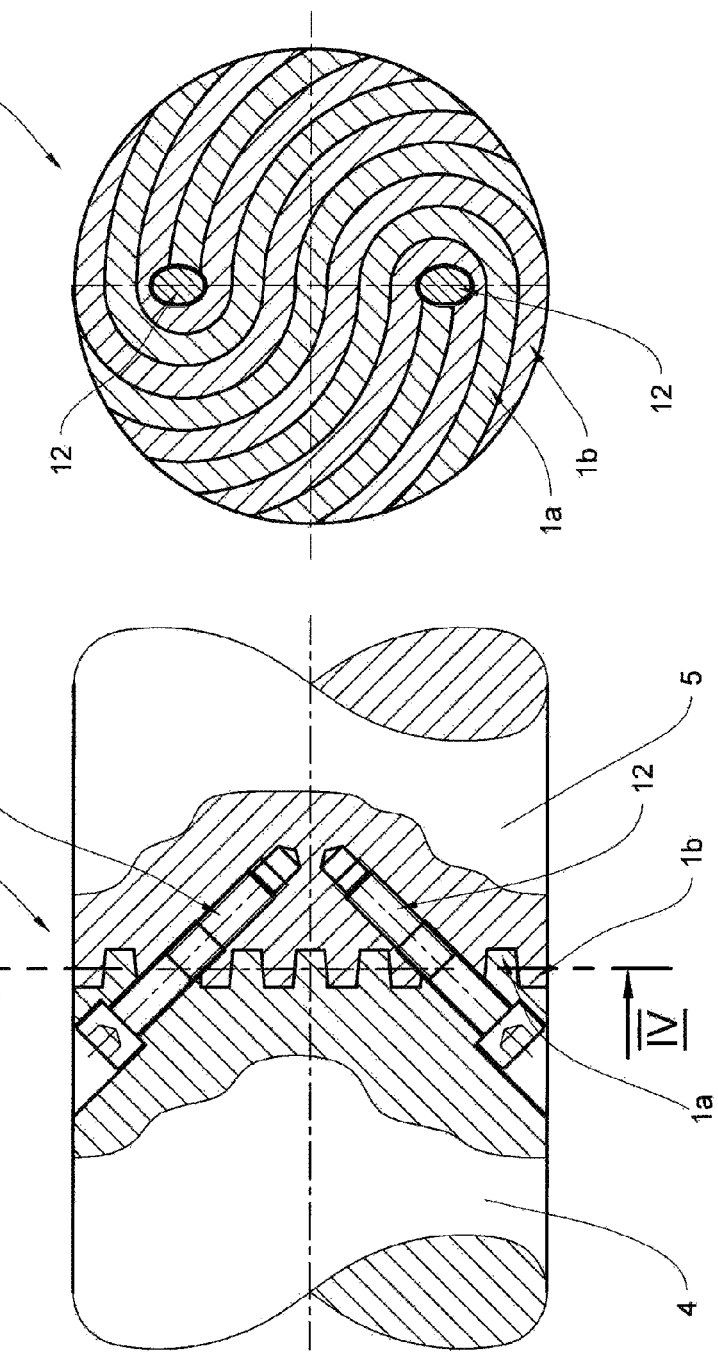

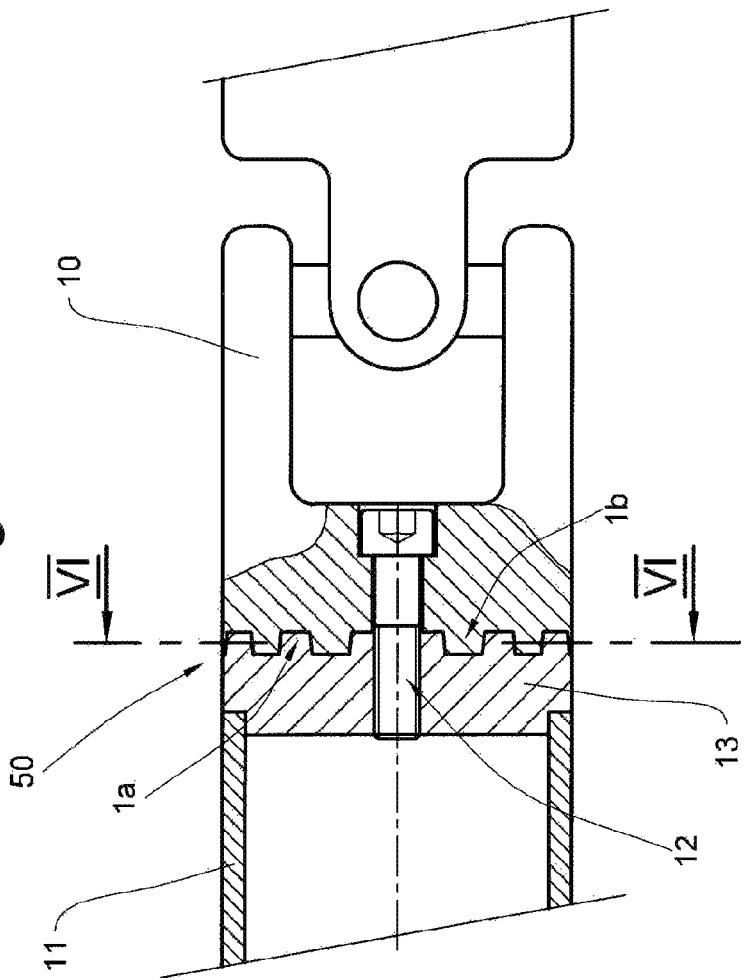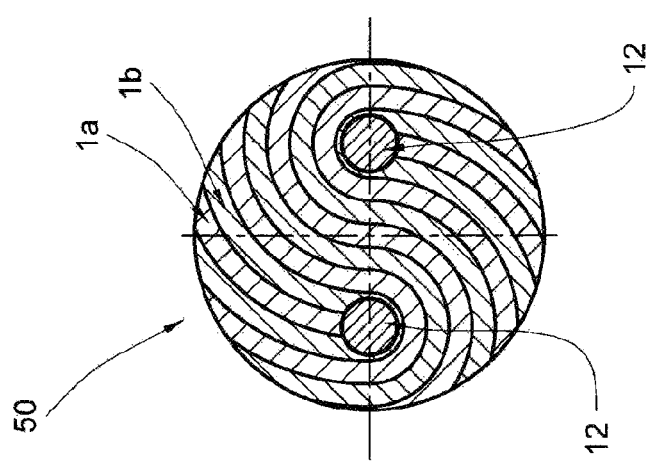

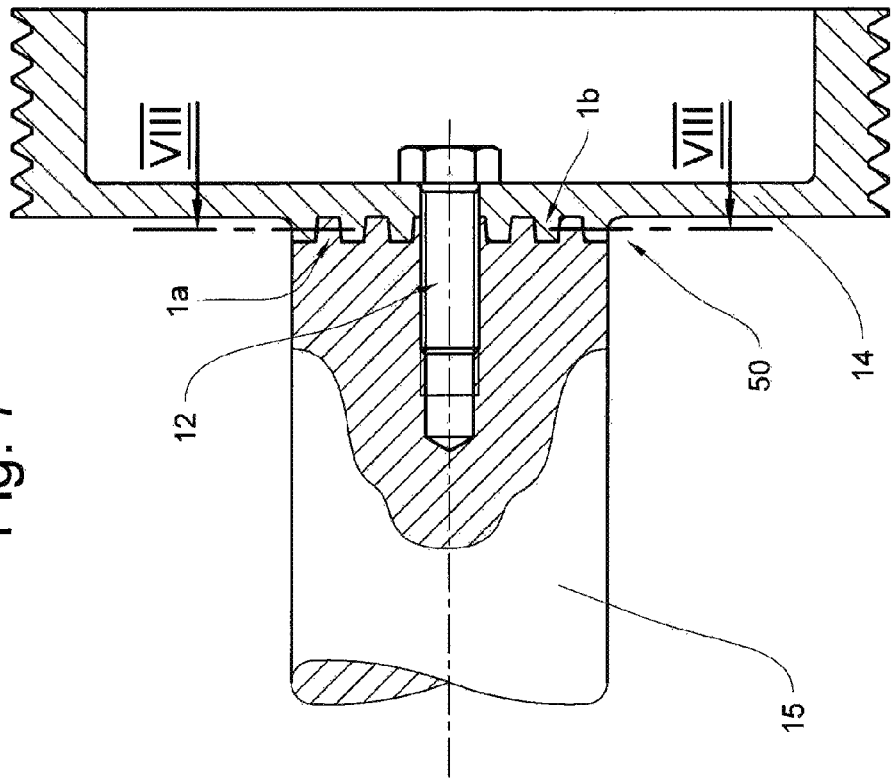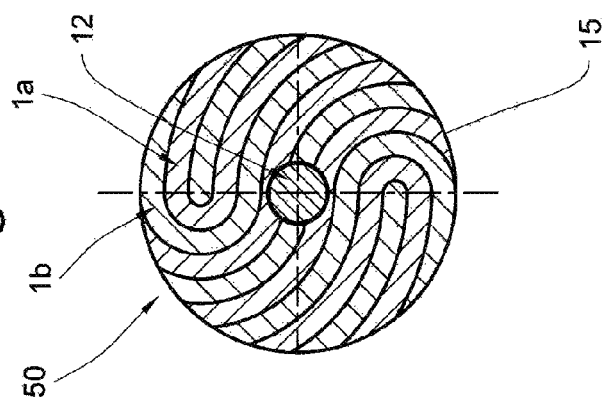

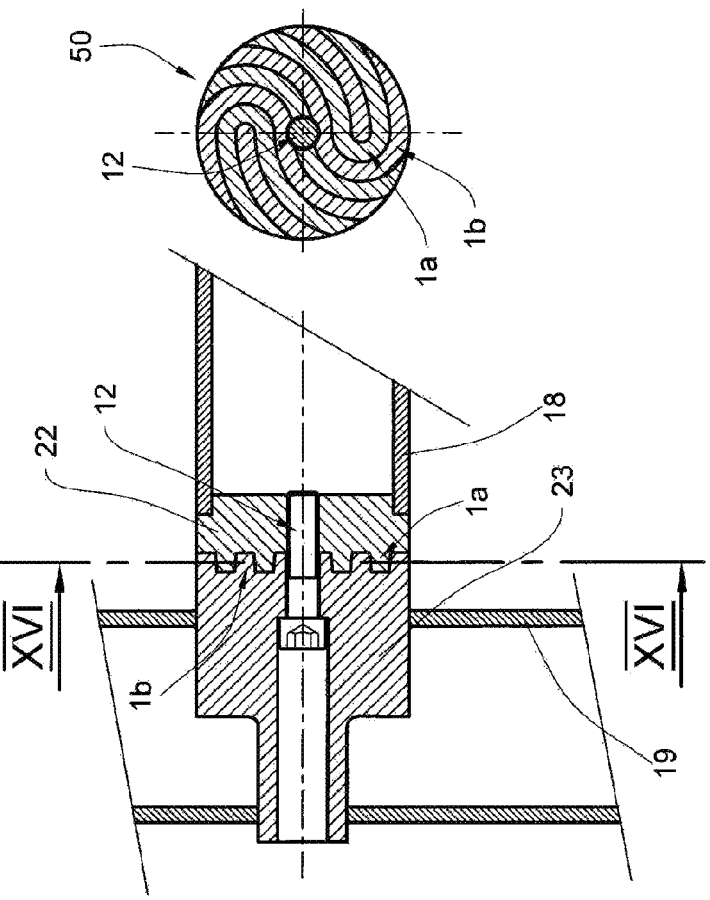
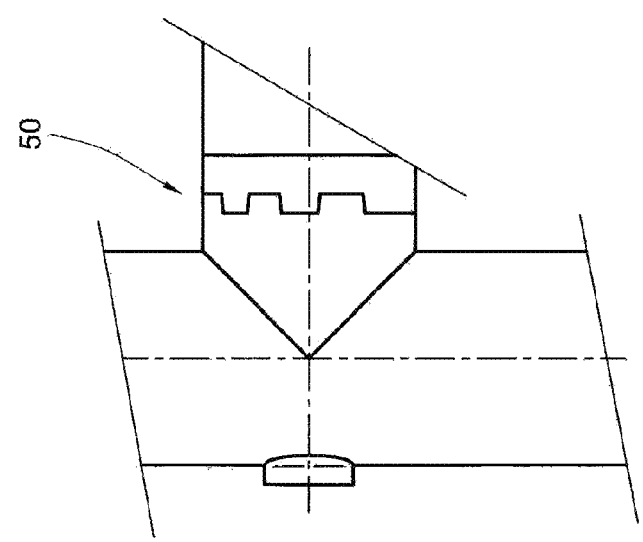

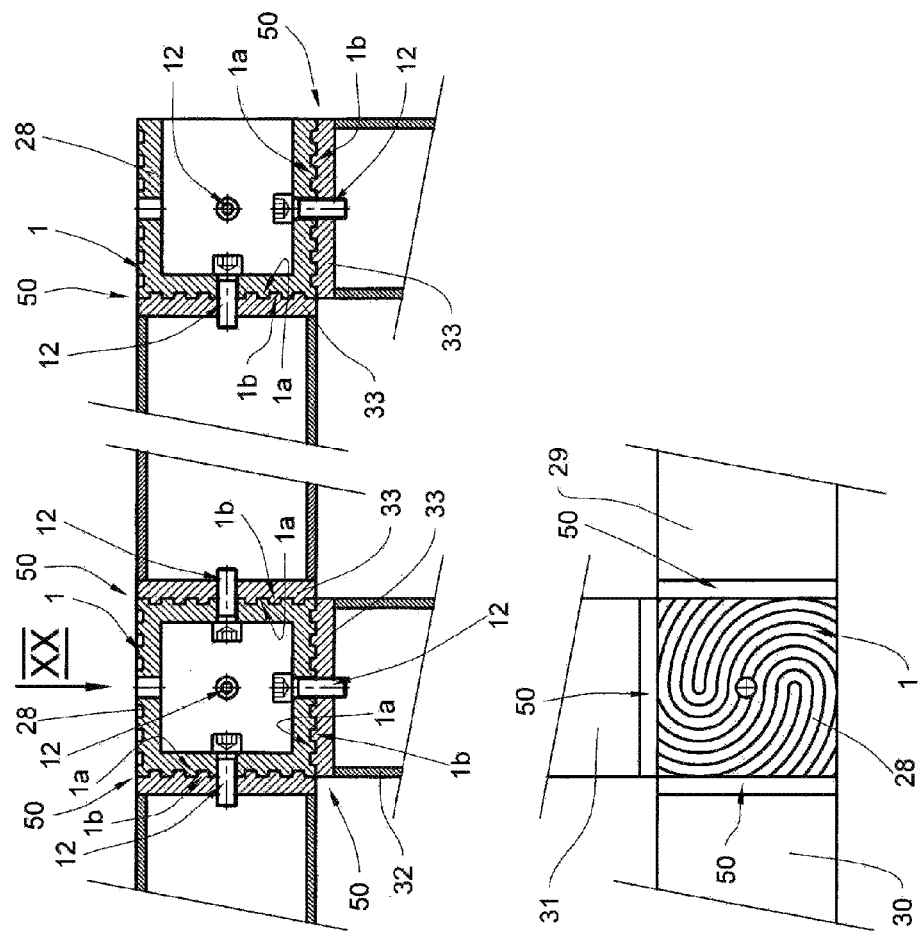

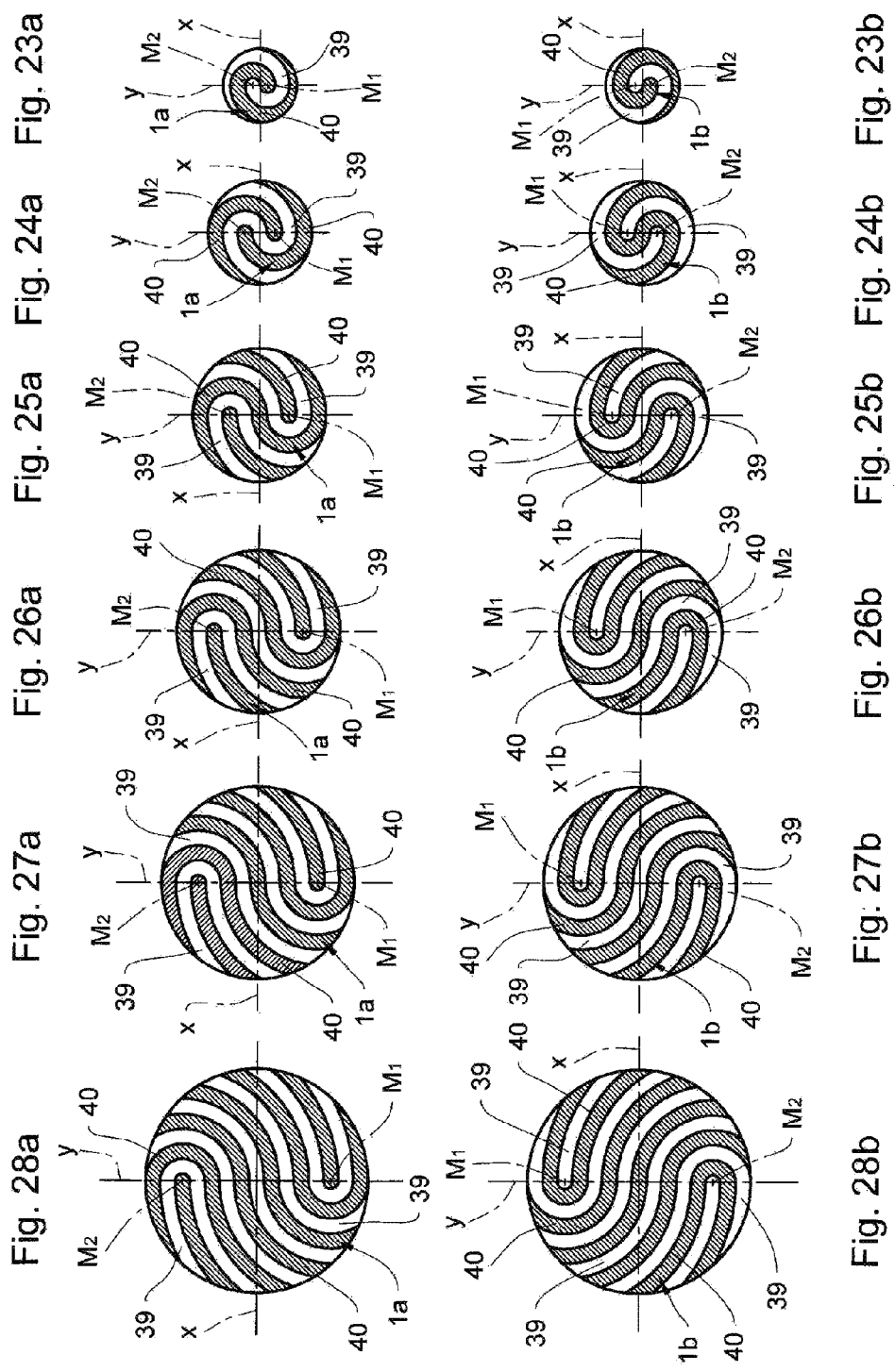

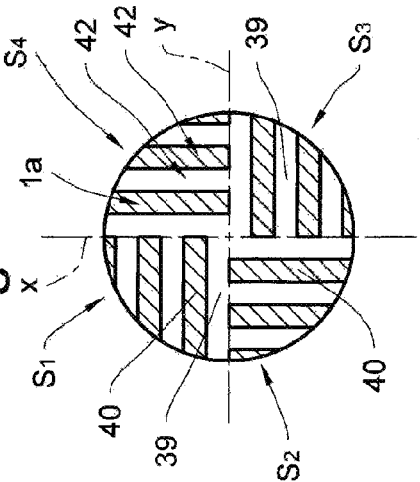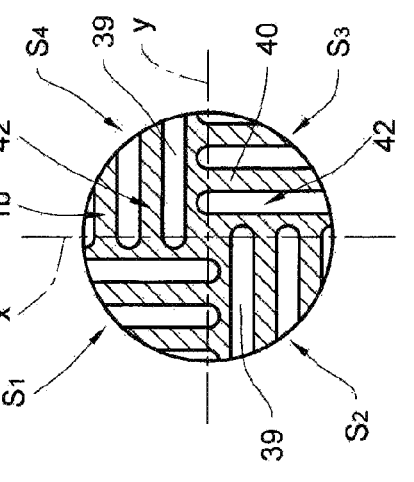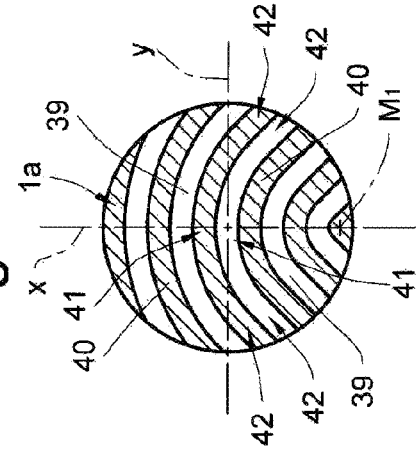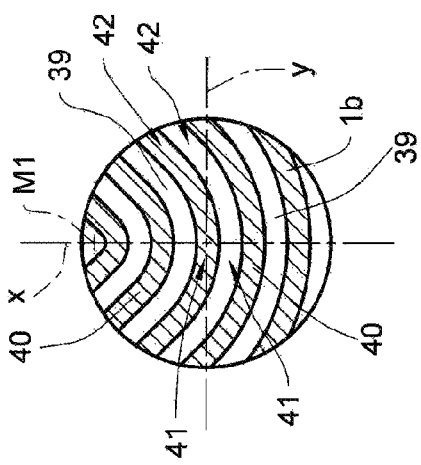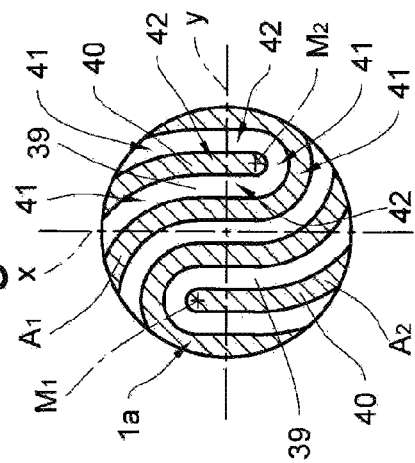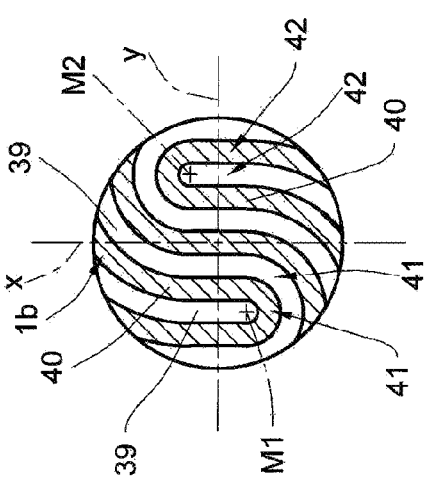

COUPLING

CROSS REFERENCE TO RELATED APPLICATIONS

This application is the US-national stage of PCT application PCT/DE2011/000351 filed 31 Mar. 2011, published 6 Oct. 2011 as WO2011/120510, and claiming the priority of German patent application 102010013720.0 itself filed 31 Mar. 2010 and German patent application 102010047466.5 itself filed 6 Oct. 2010, whose entire disclosures are herewith incorporated by reference.

The invention relates to a device for connecting ends, in particular for connecting two shafts, axles or flanges. This is meant here to cover an assembly that can be manufactured efficiently in particular for connecting ends of shafts, axles and flanges. The connection can be used, for example for connecting a drive shaft to a motor shaft, between a screw driver and a screw head, or between the rods of an assembly.

The simplest connection of ends of shafts or pins known from the prior art is the end central screw with a cylindrical centering against transverse displacement and torque transmission merely through frictional engagement. Here, there is the acute risk of the screw getting loose. In the case of central axial screws, it is absolutely necessary for a secure shaft connection to provide a form-fitting rotation prevention. There are a number of ways to prevent relative rotation. For example, face gears are known whose operative faces extend substantially radially and axially. This group includes diverse claw couplings and Voith-Hirth gears.

A typical disadvantage of these shaft connections with their radial operative faces and tangential force actions is the complex manufacturing process of the end shapes. Manufacturing is usually not carried out in one clamping position and takes place on different machine tools. Other shaft connections having operative faces extending substantially tangentially axially require hubs and belong to the group of shaft-hub connections and thus need a larger installation space than shaft connections with operative faces on the ends.

Spirally extending operative faces have the significant disadvantage that it is not possible to implement an exactly identical spacing between the turns of the spiral, and manufacturing is therefore complicated. In an Archimedean spiral, the radial spacing is constant, but the perpendicular spacing in the spiral is not.

It is the object m of the present invention to provide a form-fitting coupling that has operative faces on the ends and requires little installation space and low manufacturing cost. Moreover, it should be possible to transmit high forces such as, for example torque and transverse forces with the coupling.

A coupling in the meaning of the invention is a detachable or non-detachable connection of at least two parts for transmitting torque and/or transverse forces. For example, both movable parts can have a common rotational axis. Transverse forces are, for example forces that are directed perpendicular to the axial assembly direction.

Each groove of a first face gear and a complementary formed second face gear of the coupling has a constant width over the course of its longitudinal center line. For example, a groove bottom has a constant width.

The term "groove having a constant width" in the meaning of the invention concerns, for example the width of the groove measured perpendicular to the axial assembly direction and perpendicular to the longitudinal axis of the groove.

The term "ridge having a constant width" in the meaning of the invention concerns, for example the width of the ridge measured perpendicular to the axial assembly direction and perpendicular to the longitudinal axis of the ridge.

The complementary gears facing one another are moved into engagement, for example through an axial relative movement. "Axial assembly direction" in the meaning of the invention is, for example a movement carried out in the direction of the axis of the relative movement.

One particular characteristic is that the complementary, form-fittingly engaged gears of the parts to be coupled are formed in such a manner that, for example these parts can be machined in one clamping position on a turning machine with integrated milling unit, i.e., without tool change, or can be machined in one clamping position on a milling machine.

The low manufacturing complexity is, for example a result from the fact that the course of the groove and the course of the ridge of the structure formed on the end of the interacting coupling elements follow a mathematical function that enables a constant width of the groove and the ridge. In the case of a milling operation, the constant spacing corresponds, for example to the diameter of the milling cutter. As a suitable mathematical function determining the shape of the groove or the ridge, for example circular arcs and/or straight lines having a common center or different centers shall be selected here.

The constant width and height of the ridges and the grooves are advantageous for milling because at best only one path has to be milled per face gear, and they are also advantageous for forming and casting because forming requires a uniform material flow, and for casting, uniform cooling has to be ensured. This applies to metallic materials as well as plastics.

In the case of end operative faces extending only axially and radially, the circumferential forces act always perpendicularly on the operative faces, and in this configuration, the friction forces cannot be utilized for transmitting torques. However, according to the invention, friction forces resulting directly from the circumferential forces can be utilized for transmitting torques. Despite the frictional effects, the connection according to the invention clearly is a form-fitting connection. This connection exhibits a very advantageous additional frictional effect.

In fact, during a relative rotation of the parts to be coupled about their rotational axis, the interacting contact surfaces approach each other due to a rotation of the interacting face gears and a resulting relative movement of the contact surfaces toward each other. However, the sliding movement of the contact surfaces is hindered by the friction between the contact surfaces of the parts to be connected. In particular in the case of a dynamic alternating load, the frictional effect of the contact surfaces is very advantageous. For this reason, a centrally arranged screw can be used without the risk of getting loose.

When loaded through transverse forces, i.e., forces directed perpendicular to the axial assembly direction, the same loadability is given as in the case of a corresponding cylindrical centering. Through a plurality of uniformly distributed and thus multi-start circular segment shapes, the entire end can be utilized for transmitting forces resulting in a shaft connection with very little required space.

According to the invention, at least one of face gears has at least one groove having a constant width. Each face gear can comprise one or a plurality of grooves. The face gears are formed to be complementary; i.e., in a groove of a face gear, a ridge of the other face gear is engaged. The groove and the ridge have a shape that is complementary in cross-section to the longitudinal course of the groove or the ridge.

The simplest solution in terms of manufacturing is grooves in the form of multi-start semicircles. With a milling device on a turning machine or with a milling machine, machining the end semicircular shape according to the invention can be carried out together with the remaining cylindrical machining operations in one clamping position of the workpiece. In contrast, conventional shaft connections require significantly more elaborate machining.

According to the first aspect of the invention, the longitudinal center line of the groove forms a circular arc about a first center in at least one section of the groove and forms a circular arc about at least one second center in another section of the groove. The first center and the second center, for example are spaced apart from one another. The longitudinal center line of the groove can form a plurality of circular arcs about the first center and/or a plurality of circular arcs about the second center. "At least one second center" in the meaning of the invention means that the longitudinal center line of the groove can also form at least one circular arc about a third, fourth or further centers.

For generating the inventive face gear according to the first aspect of the invention, two circular arc centers are required if torque and transverse forces are to be transmitted. By centrally dividing the front face of the parts to be coupled, for example of two shafts, by a straight line into a right and a left half and determining two center of curvatures on each front face with each of the center of curvatures being arranged laterally reversed with respect to a center defined on a straight line, then, starting from the center of curvatures, it is possible to generate circular arcs in the form of grooves in each case on one side of the front face with regard to the straight line, the grooves having a constant spacing and, for example a maximum arc angle of 180°. For example in at least one face gear, at least one ridge remains between the circular-arc-shaped grooves. The ridge of a face gear engages in the groove of the respective other face gear.

All circular arc structures of a front face half, for example have a common center of curvature. The center of curvatures are arranged spaced apart from the center of the face gear; in particular, two center of curvatures have the same spacing from the center of the face gear. The circular arcs, for example are at least partially formed as a semicircle. The center of curvatures, for example are arranged on the straight line that divides the front face.

Alternatively, in each end half, at least one center of curvature can be arranged laterally reversed with respect to the center and spaced apart from the straight line. The circular-arc-shaped sections of the groove or the ridge, which are formed about a first center of curvature, can be connected, for example by straight lines to the circular-arc-shaped sections of the groove or the ridge that are formed about a second center of curvature.

The larger the spacing between the center of curvatures, the higher are the torques that can be transmitted. The larger the spacing between the center of curvatures, the more grooves (also called "turns") are required. The smallest spacing between the center of curvatures results in a single-start shape. In a single-start shape, the spacing between the center of curvatures corresponds to twice the value of the groove or ridge width. The groove width corresponds approximately to the possible diameter of the milling cutter.

Depending on the application, depending on the magnitude of the torque to be transmitted and depending on the available diameter of the coupling, the number of turns of the shape and thus the width of the ridges and grooves can be freely selected. The lowest manufacturing expenditures occur in the case of a single-start shape because this results in the largest possible milling cutter diameter and the shortest cutting path that, however, comes at the expense of the transmittable torque.

The circular arc is centered on a first center of curvature or at least a second center of curvature. The circular-arc-shaped sections of a plurality of grooves of a face gear can be allocated, for example to at least two different center of curvatures. Moreover, the circular-arc-shaped sections of a groove can be centered on at least two different center of curvatures.

According to one embodiment, the longitudinal center line of the groove forms at least two circular arcs that are alternatingly centered on a first center of curvature and a second center of curvature. The sections of the groove that form circular arcs about different center of curvatures can be arranged directly adjacent to each other. Alternatively, it is also possible that a straight section is formed between the circular arc sections that are centered on different center of curvatures.

According to the second aspect of the invention, at least one of the face gears has at least one groove having a constant width, wherein the longitudinal center lines of the grooves are formed by at least one circular arc and at least one straight line. Circular arcs and straight sections can alternate, for example. The straight section of the groove, for example can be arranged between two circular-arc-shaped sections of the groove. Alternatively, the circular-arc-shaped section can be arranged between two straight sections. The circular arcs, for example have a different radius measured from the center of curvature.

According to a further embodiment, the circular arc formed by the groove or the ridge has a central angle of $\alpha \leq 180°$. Each groove and each ridge in the form of a circular arc with a given radius, for example is maximally formed as a semicircle.

According to a third aspect, the invention is achieved by a coupling with the features of the claim 5.

At least one of the face gears has a groove having a constant width, and the longitudinal center line of the groove is formed as a straight line.

In the case of the straight lines, the center of curvature is located in infinity. When using only straight lines, transverse forces and torques can only be transmitted if not all of the straight lines run parallel. Here, at least two circular arc centers have to be located in infinity.

The front face of the coupling parts, for example can be divided into two regions, wherein in a first region at least one groove is formed, and wherein in at least one second region at least one groove is formed that is arranged at an angle, in particular at a right angle, to the groove of the first region. If at least two grooves are formed in one region, these grooves, for example can be arranged parallel to each other. For example, each face gear can comprise four regions, wherein each region is provided with at least one groove. In particular, a plurality of grooves is formed in each of the regions and the grooves of each region are parallel to each other.

The following embodiments refer to all three aspects of the invention.

An advantageously extended embodiment of the shaft connection according to the invention is characterized in that the operative faces extend on one side along semicircles and the radial slope is superimposed by an axial slope. "Radial slope" in the meaning of the invention means a slope radial to the center of the face gear. "Axial slope" in the meaning of the invention means a slope in the direction of the axial assembly direction of the parts to be coupled.

Another embodiment is characterized in that all groove widths and all ridge widths are identical. The grooves and ridges, for example have a constant width in the longitudinal direction of the course of the groove. In the case of grooves or ridges, the width of which changes over the course of the height of the groove, the width in a certain height is constant over the longitudinal course. For example, the groove width at the groove bottom and the ridge width at the ridge base are substantially constant. All grooves and ridges have the same width, for example.

Another embodiment is characterized in that all the grooves and/or all the ridges have identical widths. If a plurality of grooves and a plurality of ridges are present, all grooves can have the same groove width. The groove width, for example can differ from the width of the ridges. All the ridges have the same width.

Another configuration of the invention is characterized in that the groove-cross-section is trapezoidal and the ridge cross-section is trapezoidal so as to be complementary to the groove. Trapezoidal in the meaning of the invention means that the side walls of the groove form an obtuse angle to the groove bottom. With the features of this embodiment, assembling the face gears and thus the coupling parts is made easier. The contact surfaces between the first face gear and the second face gear are the side walls of the groove of a face gear against which the side walls of the ridge of the other face gears rest so that the side walls can be secured against each other without play. Since a gap remains between a bottom of the groove and an outer surface of the ridge, the transition of the groove bottom to the side walls can be provided with a radius without the necessity that the ridge has to be provided with a complementary radius. However, it is of course possible that the ridge has such a complementary radius.

Another embodiment is characterized in that the first face gear can be brought into engagement with the second face gear in a detachable manner. The face gears can then be moved out of engagement or brought into engagement as often as required. Detaching or engaging can take place, for example through an axial straight-line movement. Engagement can be secured through a detachable connection. By means of a centering device that has first guiding means on the first face gear and second guiding means on the second face gear, the complementary face gears can be guided into engagement, for example in a simplified manner.

Another embodiment is characterized in that the first face gear is connected to the second face gear in a permanent manner. After the coupling elements have been brought into engagement, for example they can be welded, glued or soldered together and thus are connected to each other in a permanent manner.

According to a fourth aspect, the invention relates to a coupling for connecting at least two parts with at least two couplings according to any one of the above-described aspects of the invention.

It was an object of the invention to provide a coupling device that has at least two form-fitting couplings with operative end faces, and that requires little installation space and low manufacturing expenditures. Moreover, it shall be possible with the coupling to transmit high forces such as, for example torque and transverse forces. It shall be possible with the coupling device to connect front faces that point in different spatial directions.

The object is achieved according to a fourth aspect of the invention by a coupling with the features of the claim 11.

The coupling device has at least two couplings, where one of the complementary face gears of the coupling is on the part, and the other of the face gears is on a coupling element that has at least two face gears. The face gear, for example can be fastened to the parts in a detachable or permanent manner. The coupling element, for example can be formed as a cube or other polygonal body whose side faces point in different directions. At least two cube sides have face gears. Parts whose face gears point in different spatial directions can be connected by the coupling element and can form the coupling device. In each case one face gear of the coupling element and one face gear of the part oppose each other in such a manner and can be brought into engagement through an axial mating movement. An assembly can be formed from a multiplicity of parts that are connected to each other by a plurality of coupling elements.

Figure 11:
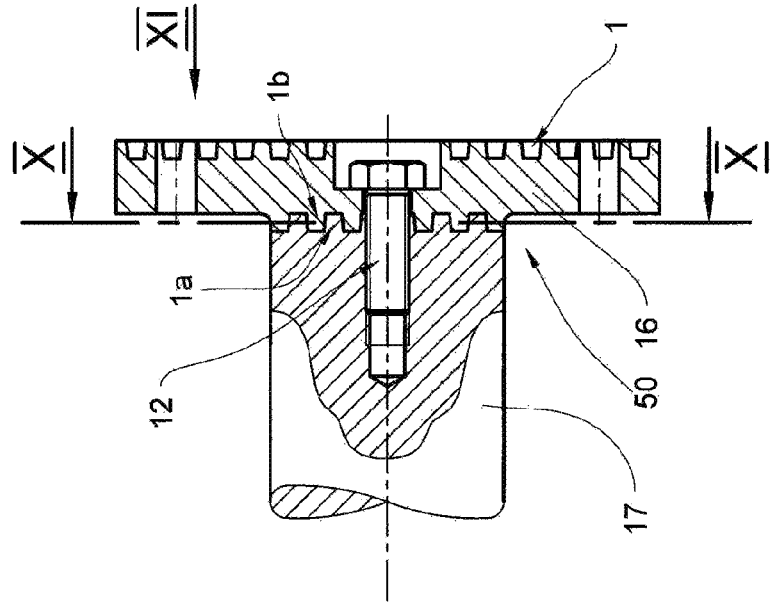
Figure 10:
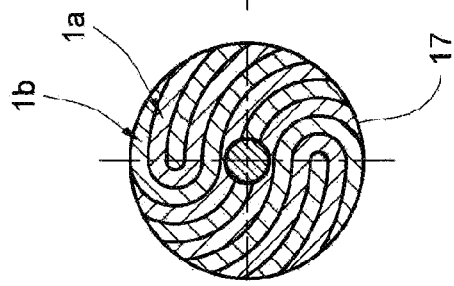
Figure 12:
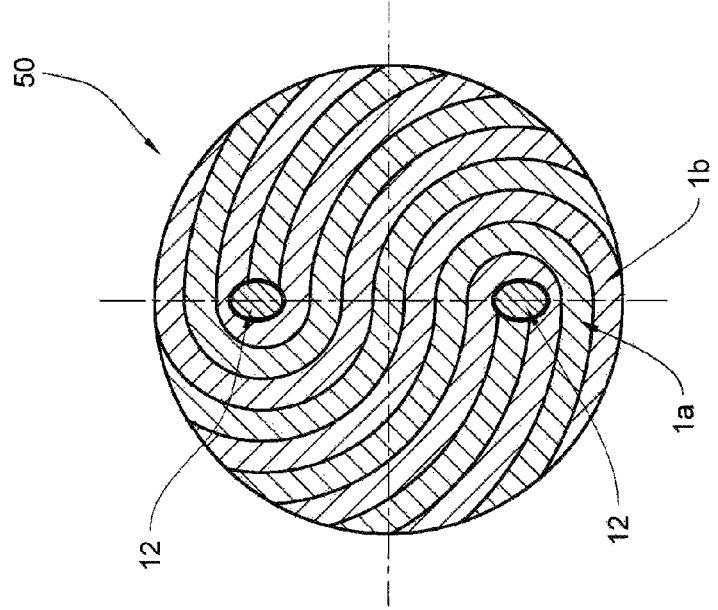
Figure 13:
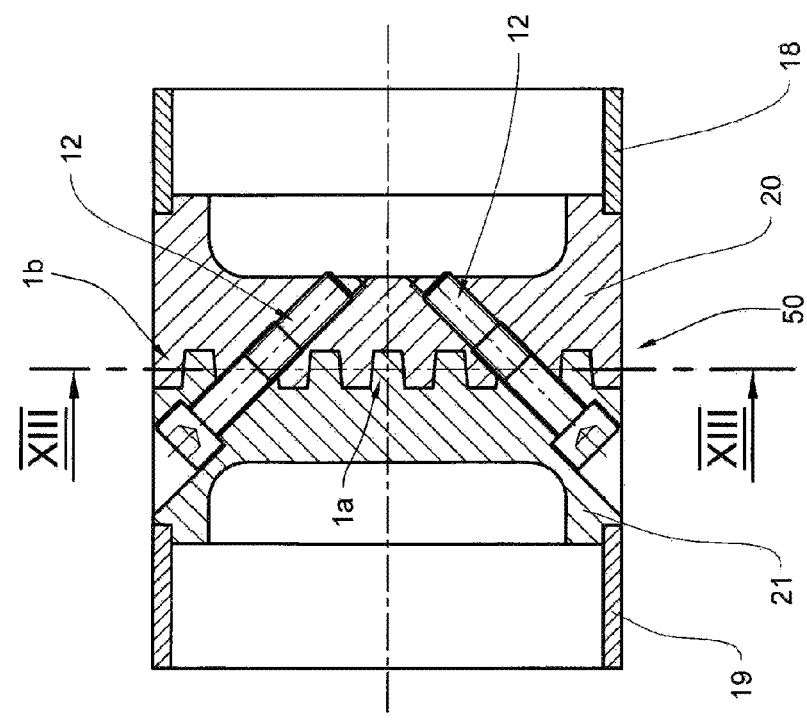
Figure 17:
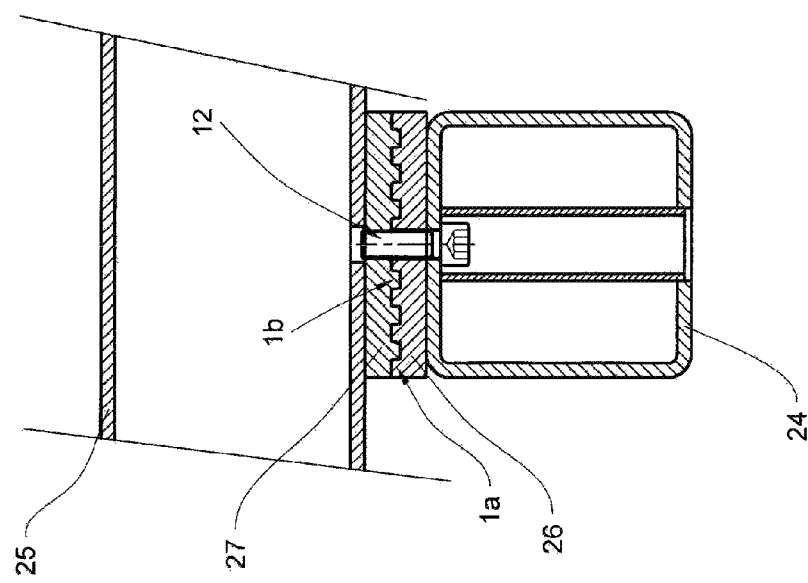
Figure 18:
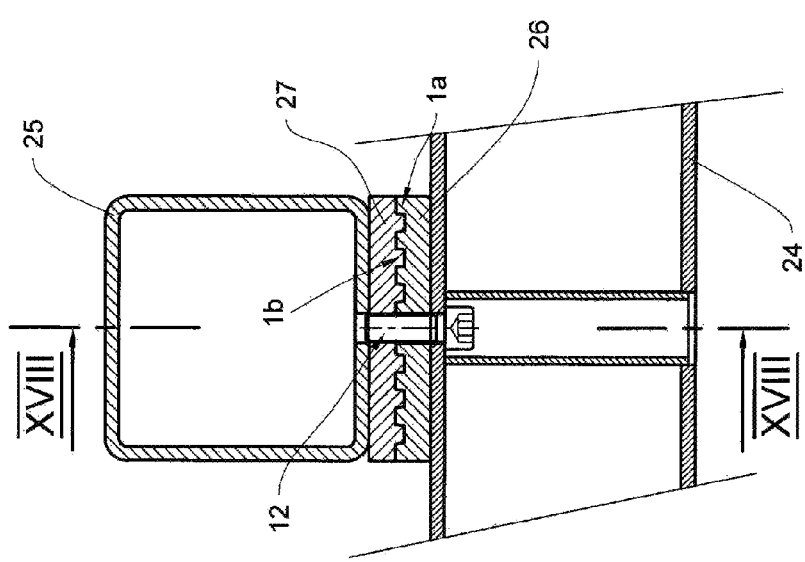
Figure 21:
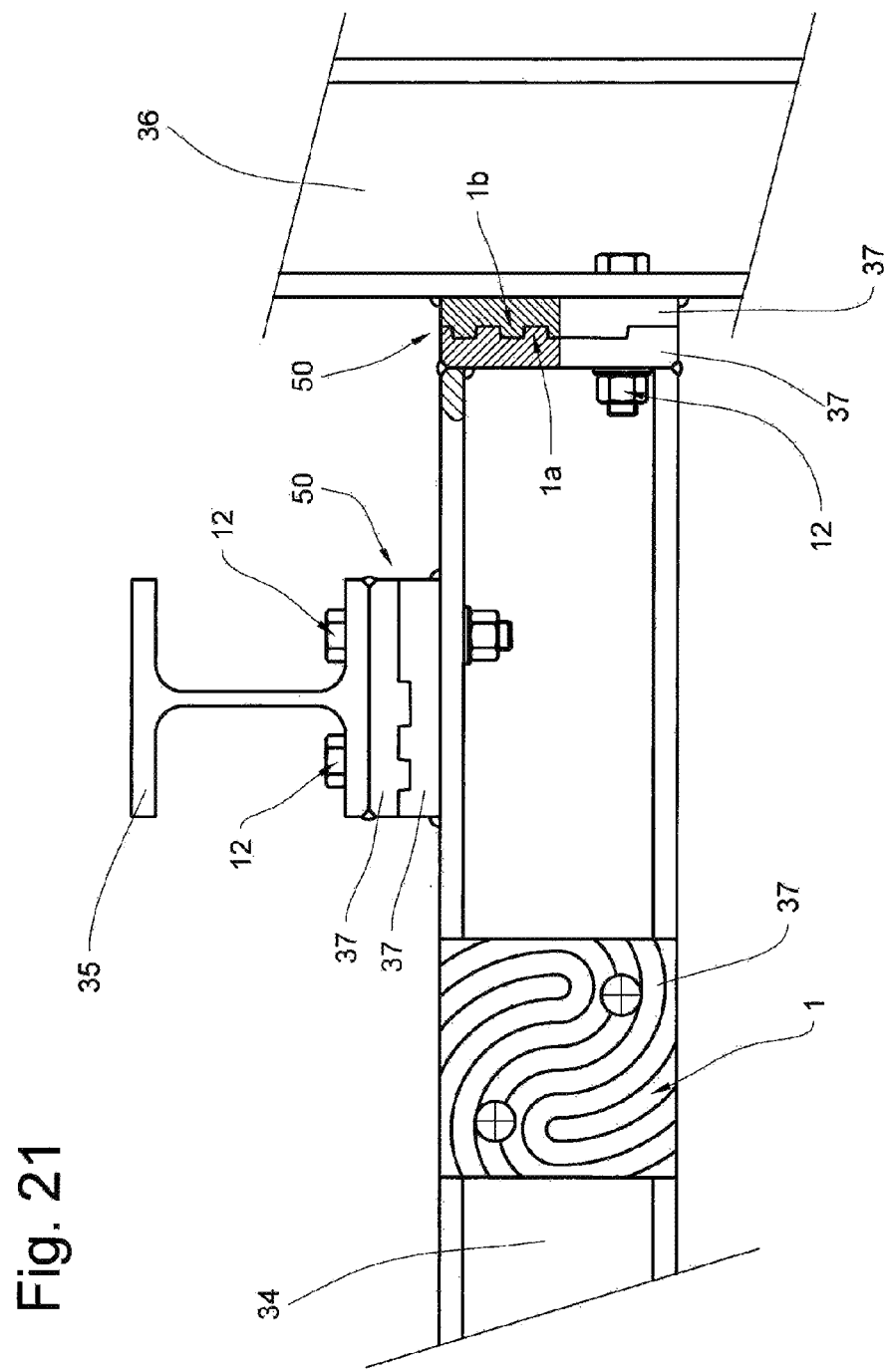
Figure 22:
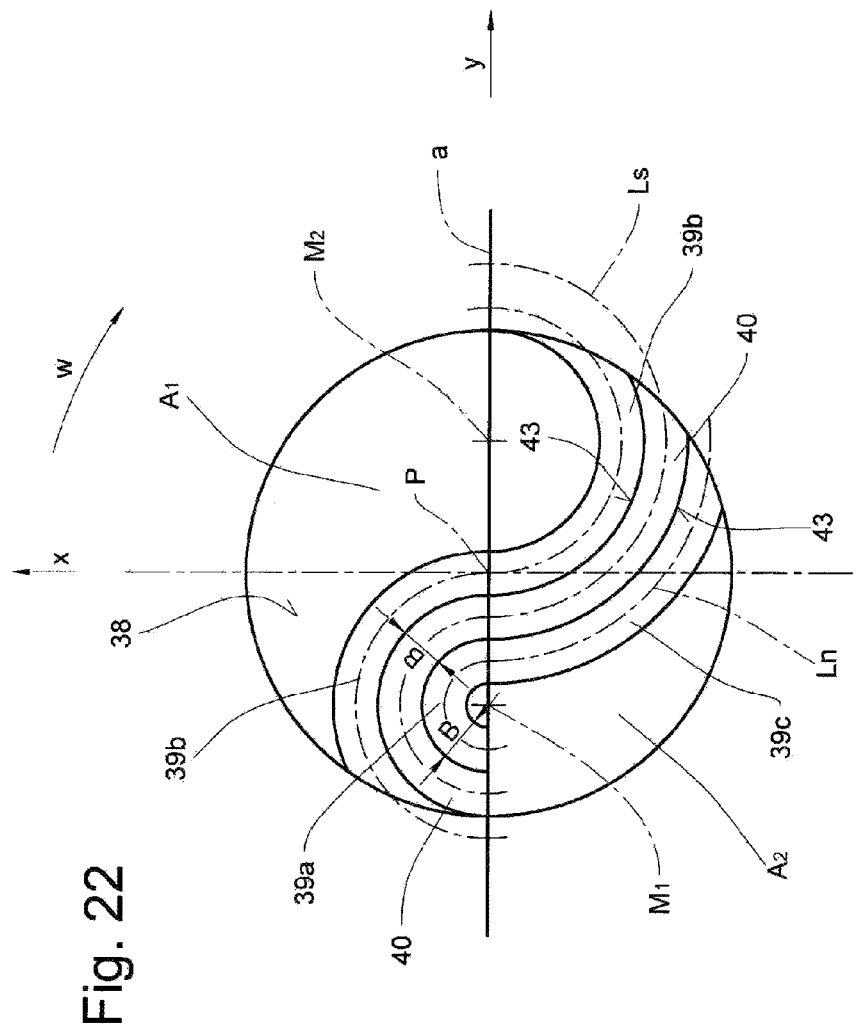

Further advantages of the invention arise from the description of embodiments shown in the figures. Therein:

FIG. 1 is a schematic top view of a face gear having a circular outer edge,

FIG. 2 is a schematic top view of a face gear having a rectangular outer edge, FIG. 3 is a schematic view of two shafts that are connected by the coupling according to the invention, FIG. 4 is a section taken along line IV-IV of FIG. 3, FIG. 5 is a schematic, partly sectional side view of a the invention, FIG. 8 is a schematic section taken along section line VIII-VIII of FIG. 7, FIG. 9 is a schematic, partly section through a hub-free coupling flange connected to a shaft by the coupling according to the invention, FIG. 10 is a section taken along section line X-X in FIG. 9, FIG. 11 is a view according to arrow XI of FIG. 10, FIG. 12 is a section through two round tube shafts that are connected to each other by the coupling according to the invention, FIG. 13 is a schematic section taken along section line XIII-XIII in FIG. 12, FIG. 14 is a schematic top view of two round tube shafts connected to each other by the coupling according to the invention, FIG. 15 is a section through the round tube shafts according to FIG. 14, FIG. 16 is a section taken along section line XVI-XVI of FIG. 15, FIG. 17 is a schematic section through an embodiment of two tube shafts that are rectangular in cross-section, that extend at a right angle to each other, and that are connected to each other by a coupling according to the invention, FIG. 18 is a schematic section according to the section line XVIII-XVIII of FIG. 17, FIG. 19 is a schematic section through an assembly of tube shafts that are rectangular in cross-section and connected to each other by a cube having the couplings according to the invention, FIG. 20 is a view according to arrow XX of FIG. 19, FIG. 21 is a partly sectional schematic view of I-beams connected to each other by the coupling according to the invention, FIG. 22 is a schematic view of the manufacturing method of a face gear according to the invention, FIG. 23*a* is a schematic view of a first face gear according to a first embodiment, wherein the face gear has a groove and a ridge, FIG. 23*b* is a schematic view of a second face gear that is formed complementary to the first face gear according to FIG. 23*a*, the face gear likewise comprising a groove and a ridge, FIGS. 24*a* and 24*b* are schematic views of the first and the second face gears according to a second embodiment, the face gear according to FIG. 24*b* comprising two grooves and one ridge, and the face gear according to FIG. 24*a* is formed complementarily and has two ridges and one groove, FIGS. 25a and 25b are a schematic view of the first and the second face gears according to another embodiment, the face gear according to FIG. 25b comprising three grooves and two ridges, and wherein the second face gear is formed complementarily, FIGS. 26a and 26b is a schematic view of the first face gear and the complementary second face gear according to another embodiment, the face gear according to FIG. 26b comprising four grooves and three ridges, FIGS. 27a and 27b are schematic views of the first face gear and the complementary second face gear according to another embodiment, the face gear according to FIG. 27b comprising five grooves and four ridges, FIGS. 28a and 28b show a schematic view of the first face gear and the complementary formed second face gear according to another embodiment, the face gear according to FIG. 28b comprising six grooves and five ridges, FIGS. 29a and 29b are a schematic view of the first face gear and the complementary formed second face gear according to a further embodiment, the face gear according to FIG. 29b has four grooves and three ridges, and wherein each groove and each ridge are formed by circular arcs in combination with straight lines located therebetween.

Figure 32:
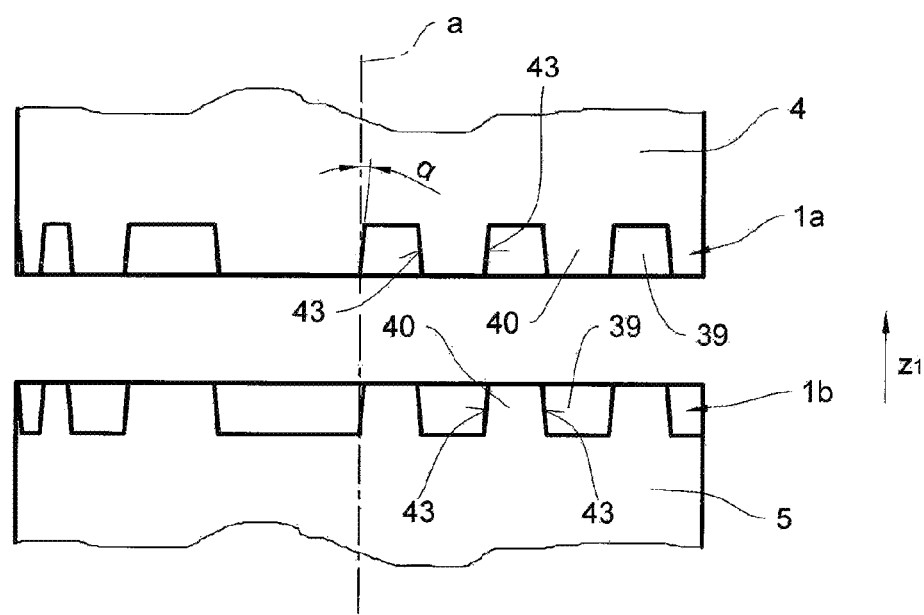
Figure 33:
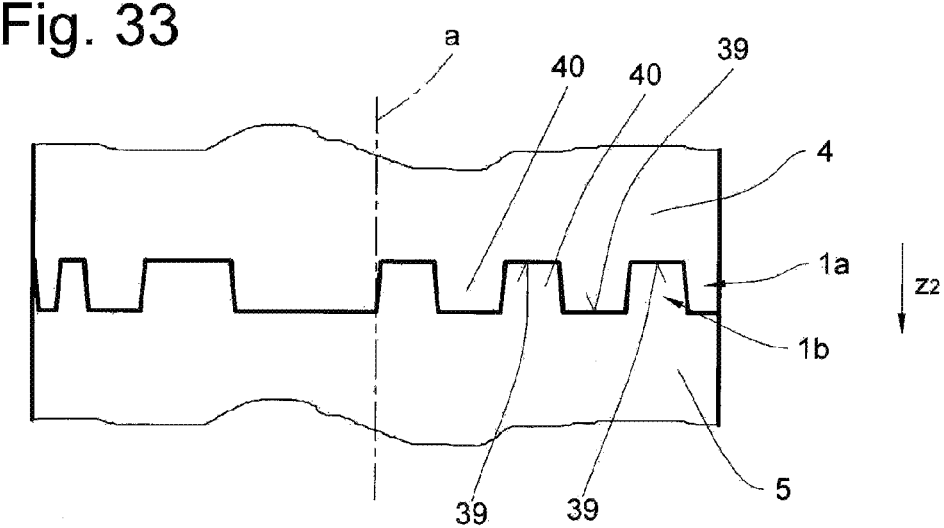
Figure 34:
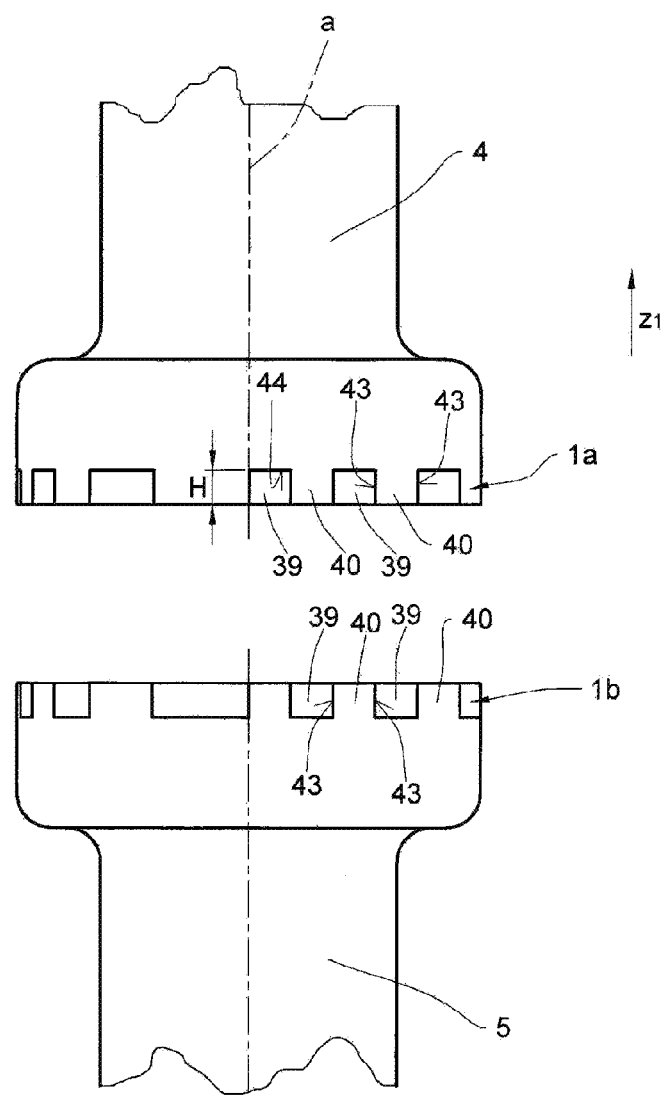

FIGS. 30a and 30b are a schematic view of the first face gear and the complementary formed second face gear according to a further embodiment, each groove and each ridge being formed from a combination of a circle segment and at least two straight sections, and wherein all circular arcs have a common center of curvature, FIGS. 31a and 31b are a schematic view of the first face gear and the complementary formed second face gear according to another embodiment, each face gear having twelve grooves that are each straight, FIG. 32 is a schematic side view of the coupling according to FIG. 3, a first shaft being provided with a first face gear and a second shaft being provided with a second complementary formed face gear, the first and the second face gears being disengaged and the ridges and the grooves of the complementary face gears having a trapezoidal shape, FIG. 33, based on FIG. 32, is a schematic side view of the shafts according to FIG. 3, the face gears being engaged, FIG. 34, based on FIG. 32, is a schematic side view of the shafts, the first and the second face gears being disengaged, and wherein the side walls of the grooves are parallel with regard to the center axis a.

A coupling is shown generally in the drawings at reference number 50. Identical reference numbers in the different embodiments designate corresponding parts, even if letters are added or omitted.

Overall, the possible machine elements that can be advantageously connected in a detachable manner to the circular-arc-face gear according to the invention and that can in particular repeatedly mounted in a precisely fitting manner, can mainly be divided into two groups. On the one hand, there are the connections of the traditional machine elements of drive technology and, on the other, the connections for elements used in machine construction or steel construction.

In the following examples of the coupling according to the invention there are, for example the operative faces that can be fitted together and comprise the inventive face gear 1 according to FIGS. 1 and 2. In the top view, the face gear 1 can be formed is with different outer edges such as, for example round and angular shapes. In the embodiment according to FIG. 1, the face gear 1 has a round outer edge 2. According to the embodiment according to FIG. 2, the face gear 1 has a rectangular outer edge 3. FIGS. 1 and 2 each show only one of the face gears of the coupling. The complementary face gear is not shown.

Apart from the arrangement of the circular-arc-face gears 1a, 1b according to the invention, the following views also show the bracing of the assembled operative faces, which is carried out here by way of example by screws 12. FIGS. 1 to 29a/29b show face gears according to the first aspect of the invention, where according to FIGS. 1 to 28a/28b, the center of curvatures M1 and M2 lie on a straight line bisecting the face gear, and the first center of curvature M1 of the face gears according FIG. 29a/29b is in a first half A1 of the face gear, and the center of curvature A2 is arranged in a second half of the face gear.

As an example for an advantageous use of the connection according to the invention in the field of drive technology, the connection of ends of two shafts is shown in FIG. 3. The two shafts 4 and 5 with the complementary face gears 1a and 1b in engagement are secured together with two screws 12. In the embodiment according to FIG. 3, the coupling serves for transmitting torque and transverse forces between the shafts 4 and 5. The center axes a of the first shaft 4 and of the second shaft 5 are aligned and form a common rotational axis.

FIG. 4 is a section according to the section line IV-IV in FIG. 3. Ridges 40 of the face gear 1a engage in grooves 39 of the face gear 1b. The ridges 40 of the face gear 1b engage in the grooves 39 of the face gear 1a.

The connection of machine elements used in drive technology at shaft ends is shown in FIGS. 5 to 11. In FIG. 5, a universal joint 10 is connected to a tube shaft 11, the operative faces being secured together by screws 12. The welded plate 13 and also the universal joint 10 carry the circular-arc-shaped face gear 1 according to the invention. The universal joint 10 is not welded to the tube shaft 11, as is usually the case, and can be exchanged if repair work is required.

In FIG. 7, a hub-free pulley 14 is connected to a shaft end 15 and is secured thereto by a screw 12. According to FIG. 7, the shaft end 15 is provided on its end with a face gear 1. The face gear 1a of the shaft end 15 engages a face gear 1b of the pulley 14. FIG. 8 is a section along section line VIII-VIII in FIG. 7.

FIG. 9 shows a hub-free coupling flange 16. The coupling flange is provided with a face gear 1b and is connected to a shaft end 17 that has the complementary face gear 1a. The coupling flange 16 and the shaft end 17 are secured together by a screw 12.

As an example for the advantageous use of the inventive connection as a connecting technique for elements that are detachable and can be repeatedly mounted in a precisely fitting manner in general mechanical engineering applications, the axial connection of two round tube shafts is shown in FIG. 12. A plate 20 is welded to the end of a round tube shaft 18, and a plate 21 is welded to the end of another such round tube shaft 19. The plate 20 is provided with face gear 1a and the plate 21 is provided with a complementary face gear 1b. The face gears 1a and 1b mesh. In order to prevent the face gears 1a and 1b from disengaging, the face gears are fastened to each other with screws 12 and are secured against each other.

FIG. 15 shows by way of example the perpendicular connection of two round tube shafts 18 and 19. A plate 22 with the inventive circular-arc-shaped face gear 1a is welded to the tube shaft 18. The part 23 that likewise has the complementary circular-arc-shaped face gear 1b according to the invention is welded transverse to a longitudinal axis to the tube shaft 19. The part 23 is secured by screws 12 with the plate 22.

For connecting rectangular or square tube shafts, solutions are shown by way of example in FIGS. 17, 18 and 19. Particularly advantageous in special-purpose machine building and machine tool building is the possibility of repeated mounting in a precisely fitting manner.

FIGS. 17 and 18 show an embodiment where two square tube shafts 24 and 25, which are offset and cross each other, are fastened to each other by the circular-arc-face gear 1 according to the invention. The square-section tube shafts 24 and 25 are each provided with a flange plate 26 and 27 that each have the inventive circular-arc-face gears 1a and 1b.

The flange plates 26 and 27 are fastened to each other with a screw 12 and are secured against each other.

For connecting square tube shafts, which are commonly is used in special-purpose machine building, an advantageous coupling element is proposed that has circular-arc-face gears according to the invention that are arranged in different directions. FIG. 20 shows such a coupling element 28 that has connectivity for five square tube shafts and is shown here in the assembled state with four square tube shafts 29, 30, 31 and 32 (square tube shaft 32 is shown only in FIG. 19). FIG. 19 is exemplary four square tube shafts 29, 30, 32 each having one front plate 33 welded thereto, wherein each front plate is provided with the circular-arc-face gear 1 according to the invention and is screwed in place with screws 12.

For connecting profiles used, for example, in steel construction, the circular-arc-shaped face gears according to the invention can also be advantageously used for highly loaded flange connections. FIG. 21 shows some examples. FIG. 21 shows the connection of three double T-profiles 34, 35, 36 to each of which is welded a flange plate 37 that is provided on the flange side with the circular-arc-shaped face gear 1 according to the invention and that is secured in place by screws 12.

The screws in the preceding examples can be replaced by other detachable connections such as, for example locking hooks and cross keys, and also by permanent fasteners such as, for example rivets.

Suited as manufacturing methods for the circular-arc-face gear 1, 1a, 1b are the known cutting and non-cutting methods.

For manufacturing a first face gear according to FIG. 22, for example an unillustrated milling cutter machines the surface 38 by first milling a semicircular first groove 39a with a longitudinal center axis LN and a radius with the length 1×B (measured between M1 and LN) about the center M1 in the semicircular area A1. Subsequently, the groove 39a is cut into the semicircular area A2 by milling a semicircular groove having a radius with the length 5×B about the center M2. The centers M1 and M2 are arranged on the y-axis.

Thereafter, the cutter mills a semicircular second groove 39b having a radius with the length 3×B about the center of curvature M1 in the semicircular area A1, the longitudinal center axis LN of the second groove being spaced apart, for example, from the longitudinal center line LN of the first groove 39a by a distance 2×B. Then, the groove 39b is continued in the semicircular area A2 by milling a semicircular groove with a radius having the length 2×B about the center M2. A gear with identical groove and ridge widths is generated. Any integer multiples of the width B can be used as spacing between the center of curvatures.

This process is continued until the semicircular areas A1 and A2 are preferably completely covered with grooves 39 and ridges 40. Alternatively, according to an unillustrated embodiment, each of the front faces could also be covered only partially with grooves and ridges. The second, unillustrated face gear is formed complementary to the first face gear shown in FIG. 22. This means, the grooves of the second face gear are formed such that they can form-fittingly engage the ridges 40 of the first face gear. The ridges of the second face gear are formed analogously in such a manner that they can engage in the grooves 39 of the first face gear.

A ridge 40 having a width B and the longitudinal center axis LS remains between the grooves 39a and 39b. All grooves 39 and ridges 40 have the width B. The width B corresponds to the diameter of the milling cutter.

FIGS. 23a to 31a each show the face gear 1a and FIGS. 23b to 31b each show the face gear 1b, the face gears according to FIGS. 23a and 23b, 24a and 24b, 25a and 25b, etc. being formed complementary to each other. FIGS. 23 to 28 show in addition that the face gear according to the invention can be formed on areas with different sizes. In FIGS. 23a to 31a, and 23b to 31b, the ridges are shown hatched and the grooves are shown unhatched.

According to a first embodiment shown in FIGS. 23a and 23b, the face gear 1b according to FIG. 23b has a groove 39 and a ridge 40. The face gear 1a according to FIG. 23a is formed complementary to the face gear 1b according to FIG. 23b. Another embodiment is shown in FIGS. 24a and 24b. The face gear 1b according to FIG. 24b has two grooves 39 and the face gear 1a according to FIG. 24a has two complementary ridges 40 that fit with the grooves of the face gear 1b.

In an embodiment according to FIGS. 25a and 25b, the face gear 1b according to FIG. 25b has three grooves 39 and two ridges 40. The face gear 1a according to FIG. 25a is formed complementary to face gear 1b and has three ridges 40 and two grooves 39.

In FIGS. 26a and 26b, the face gear 1b has four grooves 39 formed by semicircular arcs and three ridges 40 formed by three is semicircular arcs. The spacing between the center of curvatures M1 and M2 corresponds, for example, to six times the groove width. FIG. 26a shows the face gear 1a that is complementary to the face gear 1b according to FIG. 26b. It has four ridges 40 and three grooves 39. The ridges 40 and the grooves 39 are formed by semicircular arcs having the centers M1 and M2.

In the embodiment according to FIGS. 27a and 27b, the face gear 1b has five grooves 39, and in the embodiment according to FIGS. 28a and 28b, the face gear 1b has six grooves 39.

From the embodiment according to FIGS. 23a and 23b to the embodiment according to FIGS. 28a and 28b, the spacing of the center of curvatures M1 and M2 from the center P increases.

In an embodiment according to FIGS. 29a and 29b, the face gear 1a has three grooves 39 and four ridges 40 that are formed by circular arcs 41 combined with straight sections 42. The straight sections 42 are located between the circular arcs 41. In this embodiment, the centers M1 and M2 are not situated on the y-axis.

The circular arcs 41 follow the course of the grooves and are formed alternatingly about the center of curvatures M1 and M2. According to FIG. 29b, the face gear 1b has four grooves 39 and three ridges 40 that are formed about the center of curvatures M1 and M2.

According to the second aspect of the invention, the face gear 1a according to FIG. 30a shown in an embodiment in FIGS. 30a and 30b has five grooves 39 and six ridges 40 that are formed by circular arcs 41 and straight sections 42, wherein the circular arcs 41 are located between the straight sections 42. The circular arcs 41 are formed about the center of curvature M1. The face gear 1b according to FIG. 30b is formed complementary and has six grooves 39 and five ridges 40. The circular arcs 23 of the face gear 23 are formed about the center of curvature M1.

In an embodiment according to the third aspect of the invention that is shown in FIGS. 31a and 31b, the face gears 1a and 1b each have four sectors S1, S2, S3 and S4. Each sector S1, S2, S3 has, for example three grooves 39 that are straight and are parallel to each other. The grooves of the sector S2 are offset by 90° with regard to the sector S1. The grooves 39 of the sector S3 are arranged offset to the sector S2 by the same angle, and the grooves 39 of the sector S4 are arranged offset to the sector S3 by the same angle. The face gear 1a is made complementary to the face gear 1b.

In particular, if the grooves 39 and the ridges 40 are of identical width, the result is simple production in terms of manufacturing because only one cutting path is required.

FIGS. 32 and 33 are based on FIG. 3 and show the face gears 1a and 1b of the shafts 4 and 5. According to FIG. 32, the shafts 4 and 5 are disengaged. In FIG. 33, shaft 4 and shaft 5 mesh so that a torque can be transmitted between the shafts 11 and 12. The outer surfaces 43a and 43b of the ridges 40 extend at an angle α from the center axis a, for example in a trapezoidal manner. The grooves 39 are formed complementary to the ridges 40 and, for example have also a trapezoidal shape.

According to another embodiment that is shown in FIG. 34, the outer faces 43a and 43b are formed parallel to the center axis a and at right angles to a groove bottom 44. According to FIG. 34, the face gears 1a and 1b of the shafts 4 and 5 are out of engagement. The face gears 1a and 1b are complementary and can be moved into detachable interfit through a relative movement of the shaft 5 in the direction z relative to the shaft 4.

The face gears each have at least one groove 39 with the width B and the height H. The groove bottom 20 is bordered on each side by a ridge 40.

If with regard to the embodiments, the wording was used that the grooves 39 or the ridges 40 are straight or circular-segment-shaped, this refers to the orientation of the longitudinal center axis LN of the groove 39 or the orientation of the longitudinal center axis LS of the ridge 40.

All face gears of the embodiments can be manufactured in each case in one clamping position of the workpiece while using in each case only one milling head. If the grooves and ridges have a constant width over the longitudinal course, only one cutting path is required in each case. With the face gears according to the invention, torques W and transverse forces parallel to the x-axis and the y-axis (see FIG. 22) can be transmitted between the parts to be connected.

The invention claimed is:

1. In a coupling having face gears for transmitting torque or transverse forces between a first part provided with a first face gear, and a second part provided with a second face gear complementary to the first face gear, at least one of the parts being in particular a shaft, an axle, a pin or a flange, and it being possible to bring the first face gear into form-fitting engagement with the second face gear, the improvement wherein at least one of the face gears has at least one groove having a constant width and a longitudinal centerline forming a semicircular arc having a respective first center of curvature in at least one section of the groove and, in at least one other section of the groove, forming another semicircular arc having a respective second center of curvature.

2. The coupling according to claim 1, wherein the longitudinal centerline of the groove forms at least two semicircular arcs that are alternatingly centered on the first center of curvature and on the second center of curvature.

3. The coupling according to claim 1, wherein
at least one of the face gears has at least two grooves or at least two ridges,
the grooves all have an identical groove width, and
the ridges all have an identical ridge width.

4. The coupling according to claim 3, wherein the groove widths and ridge widths are all identical.

5. The coupling according to claim 1, wherein the groove is trapezoidal in cross-section to the centerline.

6. The coupling device for connecting at least two parts having at least two of the couplings according to claim 1, wherein one of the complementary face gears of one of the couplings is on one of the parts, and the other of the face gears is on a coupling element that has at least two of the face gears.

* * * * *